Feb. 20, 1951 W. S. PRAEG 2,542,569
METHOD OF CROWN SHAVING GEARS
Filed July 21, 1947 9 Sheets-Sheet 2

INVENTOR.
WALTER S. PRAEG
BY Whittemore, Hulbert
& Belknap
ATTORNEYS

Feb. 20, 1951 W. S. PRAEG 2,542,569
METHOD OF CROWN SHAVING GEARS
Filed July 21, 1947 9 Sheets-Sheet 3
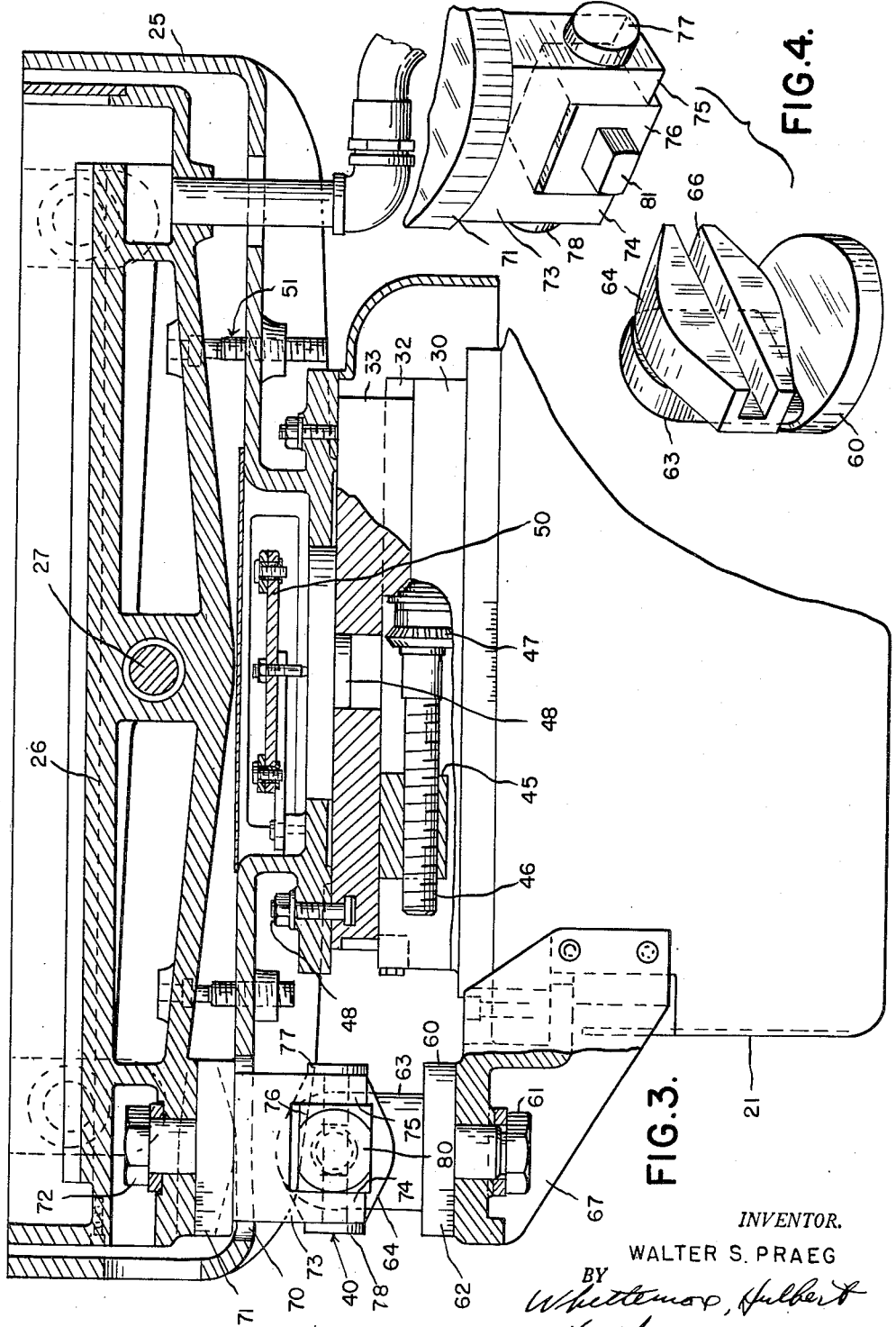
INVENTOR.
WALTER S. PRAEG
BY Whittemore, Hulbert
& Belknap
ATTORNEYS Feb. 20, 1951 W. S. PRAEG 2,542,569
METHOD OF CROWN SHAVING GEARS
Filed July 21, 1947 9 Sheets-Sheet 4

INVENTOR.
WALTER S. PRAEG
BY
Whittemore, Hulbert
& Belknap
ATTORNEYS

Feb. 20, 1951 W. S. PRAEG 2,542,569
METHOD OF CROWN SHAVING GEARS
Filed July 21, 1947 9 Sheets-Sheet 6

INVENTOR.
WALTER S. PRAEG
BY Whittemore, Hulbert
& Belknap
ATTORNEYS

Feb. 20, 1951     W. S. PRAEG     2,542,569
METHOD OF CROWN SHAVING GEARS
Filed July 21, 1947     9 Sheets-Sheet 7

*INVENTOR.*
WALTER S. PRAEG
BY
Whittemore, Hulbert
& Belknap
ATTORNEYS

Feb. 20, 1951 W. S. PRAEG 2,542,569
METHOD OF CROWN SHAVING GEARS
Filed July 21, 1947 9 Sheets-Sheet 8

INVENTOR.
WALTER S. PRAEG
BY Whittemore, Hulbert & Belknap
ATTORNEYS

Feb. 20, 1951 W. S. PRAEG 2,542,569
METHOD OF CROWN SHAVING GEARS
Filed July 21, 1947 9 Sheets-Sheet 9
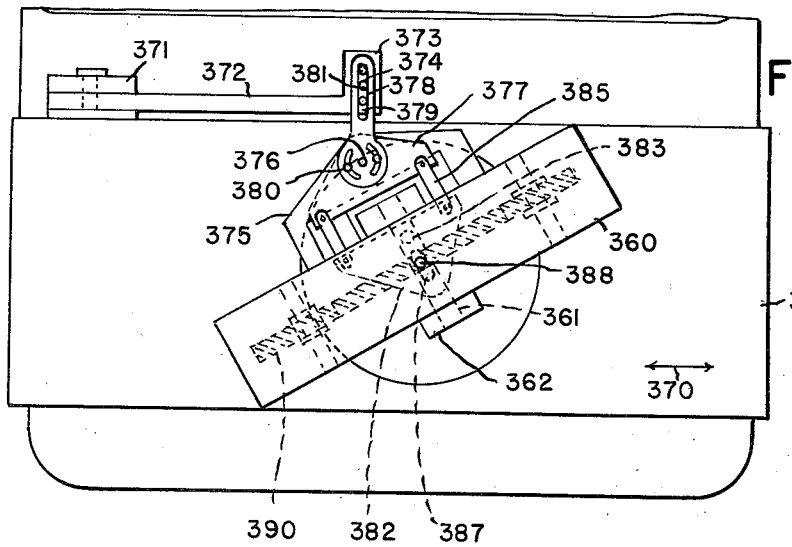
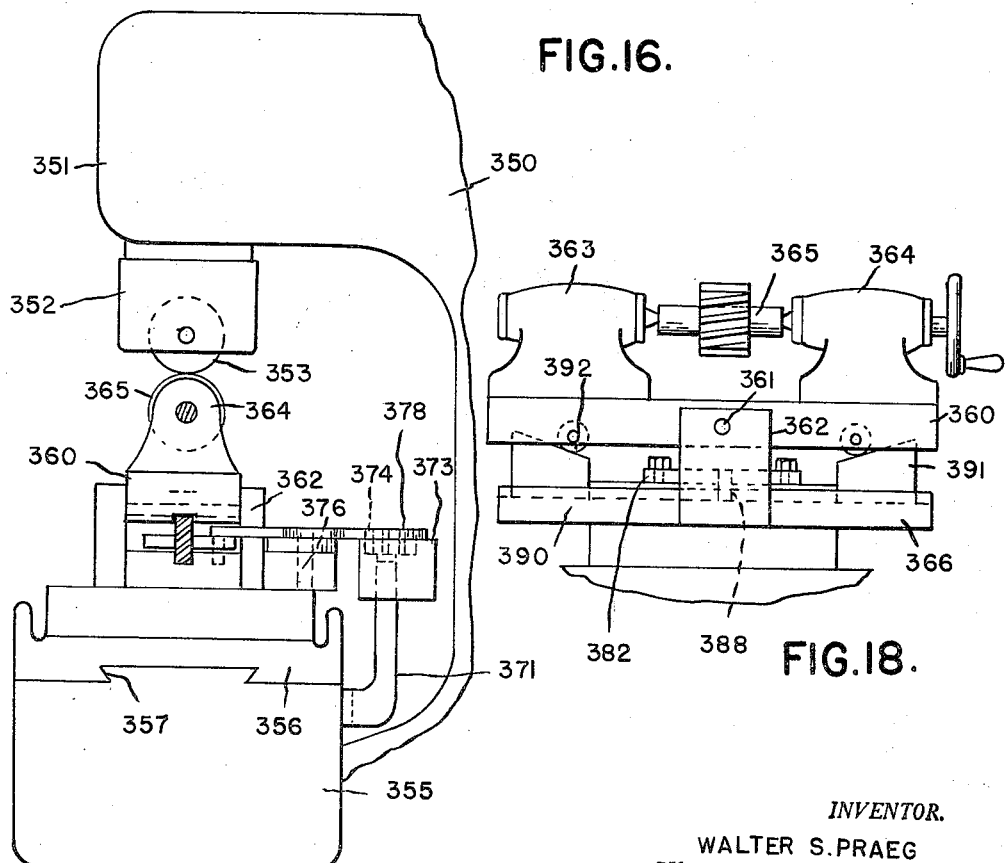
INVENTOR.
WALTER S. PRAEG
BY Whittemore, Hulbert
& Belknap
ATTORNEYS Patented Feb. 20, 1951

2,542,569

UNITED STATES PATENT OFFICE 2,542,569

METHOD OF CROWN SHAVING GEARS

Walter S. Praeg, Detroit, Mich., assignor to National Broach & Machine Company, Detroit, Mich., a corporation of Michigan Application July 21, 1947, Serial No. 762,413

4 Claims. (Cl. 90—1.6)

The present invention relates to apparatus for and a method of crown shaving gears employing diagonal traverse.

It is an object of the present invention to provide a method of crown shaving gears in which a gear and gear-like tool are driven in meshing relation with their axes crossed while at the same time the gear and tool are relatively traversed in a plane parallel to the axes of both said gear and tool and in a direction in said plane making a substantial angle with the axis of the gear, and in which a relative rocking motion is provided between the gear and tool in timed relation with respect to traverse.

It is a further object of the present invention to provide the relative rocking aforesaid such that displacement takes place equally in opposite directions from a central neutral position and reaches a maximum adjacent either end of the traverse stroke, and in which final completion of the traverse stroke is accompanied by a relatively rapid reverse rocking to position the axes of the gear and tool in substantially the neutral position.

It is a further object of the present invention to provide apparatus for crowning gears by diagonal traverse crossed axes shaving in which motion multiplying means are provided operable in accordance with traverse to effect relatively rapid crowning.

It is a further object of the present invention to provide a gear crowning machine of the type described including interconnected traverse and camming means.

It is a further object of the present invention to provide a gear crowning machine of the character described having a feed screw for effecting relative traverse between a gear and tool and a camming screw driven in timed relation to the feed screw to impart relative motion between two elements of a camming device.

It is a further object of the present invention to provide a gear crowning machine in which means are provided for angularly adjusting the direction of relative traverse between a gear and tool in combination with camming means for providing a relative rocking motion between gear and tool including connections operable in all positions of relative adjustment aforesaid to carry out the crowning motion.

Other objects and features of the invention will become apparent as the description proceeds, especially when considered in conjunction with the accompanying drawings, wherein:

Figure 3 is a fragmentary front elevation of the knee and tables shown in Figure 2, partly in section;

Figure 4 is an exploded perspective view of the camming mechanism of the machine shown in Figures 1 to 3;

Figure 16 is a fragmentary end elevation of another embodiment of the invention;

Figure 17 is a horizontal plan view of the rocking table; and

Figure 18 is a fragmentary view of the rocking table alone.

Figure 1:
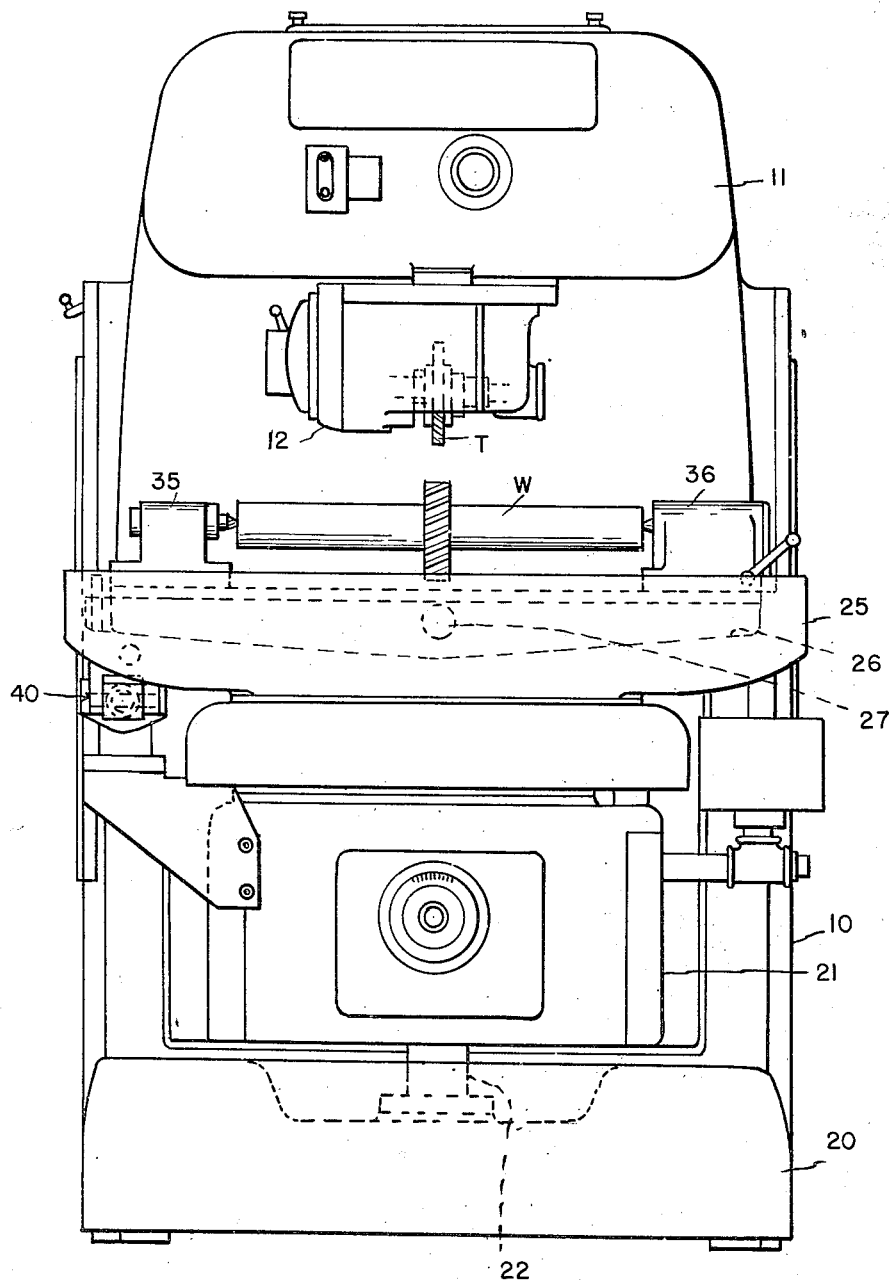
Figure 1 is a front elevation of a gear finishing machine constructed in accordance with the present invention.

Referring now to Figure 1, there is illustrated a gear shaving machine comprising a main casting or frame 10 having a forwardly projecting overhanging part 11 from which depends a tool supporting head 12 supporting and driving a rotary gear finishing tool T. The head 12 is angularly adjustable about a vertical axis and includes driving connections (not shown) by means of which the tool T may be positively rotated in different angular positions of adjustment of the head 12.

Projecting forwardly adjacent the bottom of the frame 10 is a platform 20 above which is mounted for vertical adjustment a knee 21, vertical adjustment of the knee 21 being effected by an adjusting screw 22. At the top of the knee 21 is an outer table 25 to which is pivoted a rocking or crowning table 26, the pivot support for the rocking table 26 being indicated at 27. Tables 25 and 26 are provided with means whereby they may be traversed in any direction in a horizontal plane, and these means include a lower plate 30 which is adjustable about a vertical axis. The plate 30 is formed to provide ways 32 therein in which is slidably mounted a second plate 33. The outer table 25 is connected to the upper plate 33 for relative angular adjustment about a vertical axis, and preferably the table 26 is provided with means preserving the orientation of said table, whereby plates 30 and 33 may be angularly adjustable as a unit with respect to the knee 21 and the table 25. The plates 30 and 33 which have the rectilinear ways 32 therebetween may be referred to as an adjustable sandwich for adjusting the direction of traverse of the tables 25 and 26.

Mounted on the rocking table 26 are a pair of work supporting heads 35 and 36 which are adapted to support a work piece W for rotation therebetween. In Figure 1, for simplicity the axes of the work piece W and tool T have been shown as parallel, but in practice these axes will be adjusted to cross at a limited angle so as to carry out the operation known in the art as crossed axes gear finishing.

Means are provided in the knee 21 for effecting a slow traverse of the table 25 and hence the table 26 in a horizontal plane, and other means indicated generally at 40 are provided for rocking the table 26 in timed relation to the relative traverse.

Figure 2:
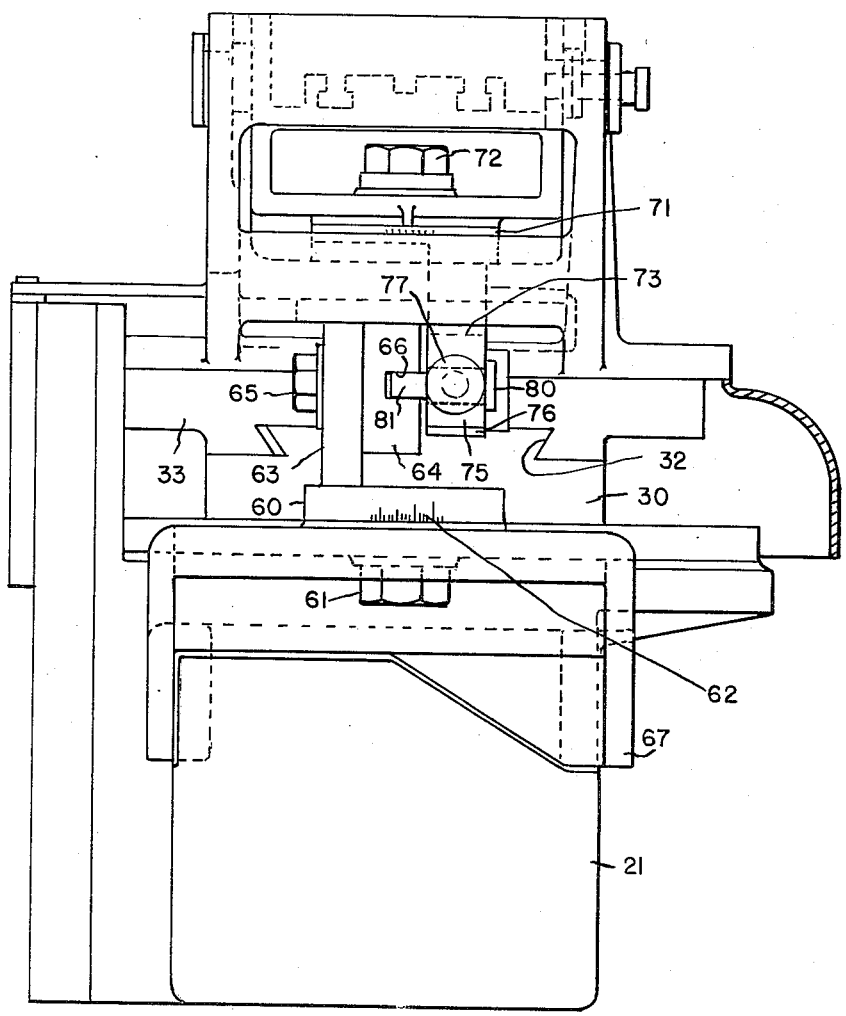
Figure 2 is an end elevation of the knee and tables of said machine.

In Figures 2 to 4 there is illustrated in detail a construction of knee and a camming device for effecting rocking of the table 26. Referring now to these figures, the upper plate 33 is provided with a depending feed nut 45 which has associated therewith a feed screw 46 rigidly supported by the lower plate 30. The feed screw 46 has a bevel gear 47 thereon which meshes with a bevel gear carried by the vertical shaft in the knee (not shown). The axis of this shaft is coincidental with the vertical axis about which the plate 30 is adjustable, and accordingly angular adjustment of the plate 30 about its vertical axis is permitted without disturbing the meshing engagement between the gear 47 and its driver.

The outer table 25 is angularly adjustable about a vertical axis on the upper plate 33, and has for this purpose a central pilot 48 fitting into an opening in the top plate 33. Clamping bolts 49 are provided by means of which the table 25 may be rigidly clamped to the upper plate 33 after adjustment has been accomplished. Preferably a linkage construction, indicated generally at 50, is provided for preserving the orientation of the table 25 during angular adjustment of the sandwich comprised by the plates 30 and 33.

The rocking table 26 which carries the head and tailstocks 35 and 36 is mounted for rocking movement about the axis of the pin 27. Jack screws, indicated generally at 51, are provided between the outer table 25 and the rocking table 26 so that the rocking table may be rigidly supported against rocking movement on the outer table 25 when the crowning operation is not to be performed. It may also be mentioned that the jack screws 51 provide means for inclining the rocking table a predetermined amount, if desired, whereby the gear finishing operation may produce slightly tapered gears. When the crowning operation is to be carried out the jack screws 51 are disconnected.

In order to provide a relative rocking motion between the rocking table 26 and the outer table 25, in timed relation to the relative traverse resulting from rotation of the feed screw 46, the camming means 40 is provided. The camming means is best illustrated in Figure 4 and comprises a disk 60 mounted for adjustment about a vertical axis as by a clamping bolt 61, indicia 62 being provided to indicate the angularity of adjustment. Upstanding from the disk 60 is an arm 63 having an opening therethrough for supporting a cam block 64, the cam block being adjustable about the axis of the opening and supported therein by a bolt 65. As best seen in Figure 4, the cam block 64 has a relatively deep slot 66 formed therein. The disk 60 is adjustably supported on a bracket 67 which extends from one side of the knee 21.

The outer table 25 is provided with a relatively large opening 70 and the remaining portion of the camming device 40 is secured to the underside of the rocking table 26 and projects downwardly through the opening 70. This comprises a disk 71 which is angularly adjustable with respect to the table 26 and is held in adjusted position by means of a supporting clamping bolt 72. Projecting downwardly from the underside of the disk is a bifurcated block 73 providing arms 74 and 75 between which is pivotally supported a block 76, this block being pivoted by pins 77 and 78 about a transverse horizontal axis. Extending through the block 76 is a cam follower pin 80 having a flattened front portion 81 receivable in the slot 66. Inasmuch as the rocking of the table 26 always takes place about the axis of the pivot support 27, this rocking motion therefore takes place about an axis perpendicular to the axis of the work W. However, since the traverse of the tables 25 and 26 with respect to the knee 21 may take place in any direction in a horizontal plane, and preferably takes place in a direction making a substantial angle with the axis of the work piece W, the swivel connections illustrated in Figure 4 are necessary to preserve the camming action during relative traverse without binding of the parts. It will be observed that adjustment of the disks 71 and 62 about their vertical axes may be effected simultaneously, and this adjustment is carried out to cause the slot 66 to extend in a plane parallel to the direction of traverse of the table 25 as determined by the angular adjustment of the plates 30 and 33. Furthermore, the slot 66 is relatively deep, and cooperating portion 81 of the pin 80 extends to a substantial depth therein so that as traverse takes place the camming relationship between the slot 66 and the follower 81 may be preserved even though the follower 81 is moved part way out of the slot 66. Binding of the follower 81 and the slot 66 is prevented by the swivel mounting provided for the block 76, as will readily be apparent.

While the slot 66 is shown as extending rectilinearly in the present modification, if desired other contours may be provided for the slot, in which case it may be desirable to provide the follower portion 81 of the pin 80 with a round contour. More specifically, and as described more in detail later, the slot 66 may have end portions extending angularly with respect to the main central portion so that as traverse takes place rocking motion of the table 25 starts from a neutral horizontal position, rocks rapidly to a limiting inclined position, thereafter rocks slowly in a reverse direction through the intermediate neutral position to an oppositely inclined limiting position, and if desired thereafter returns abruptly to a neutral horizontal position.

Figures 5, 6:
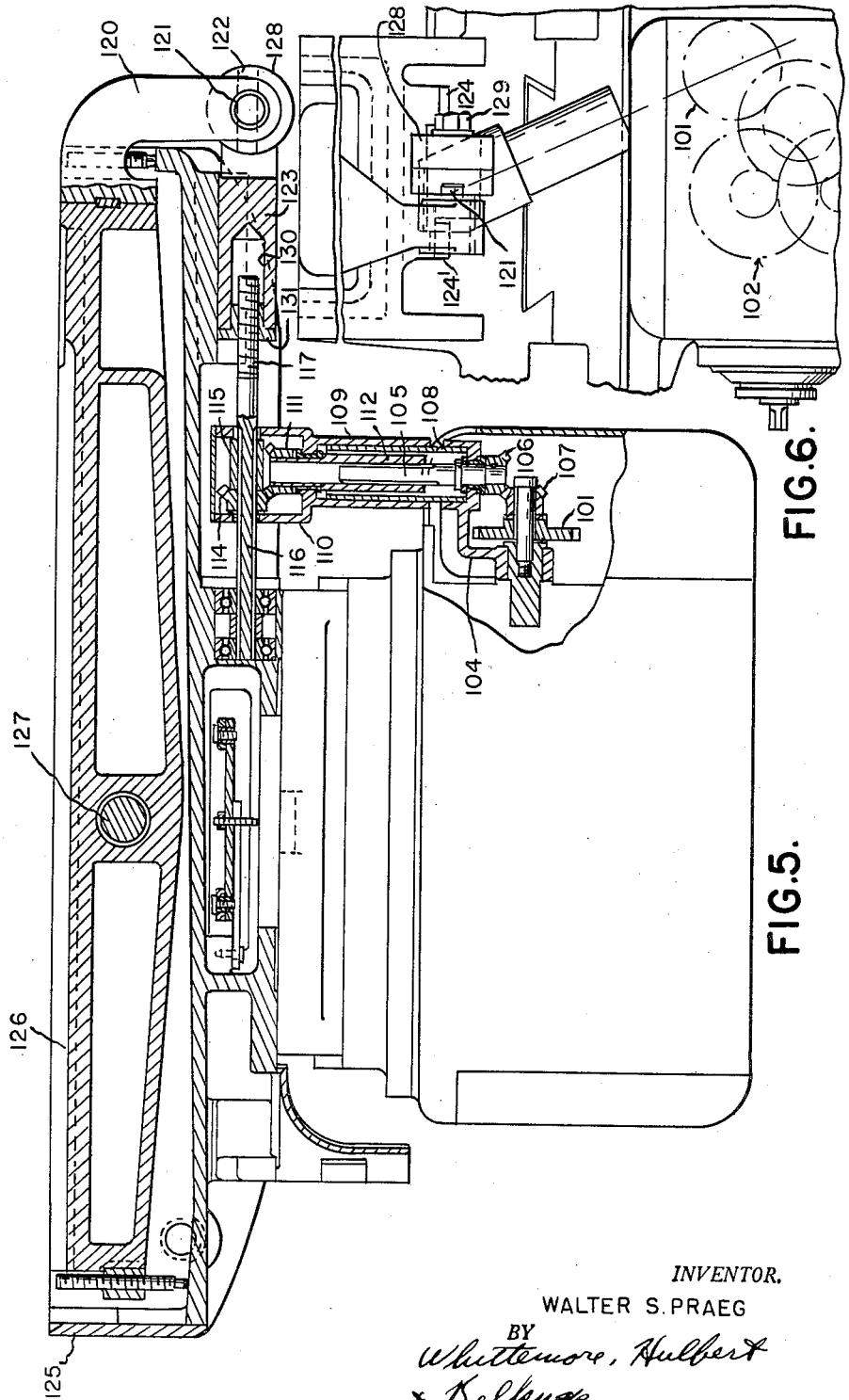
Figure 5 is a front elevation, partly in section, of a modified knee construction of the machine shown in Figure 1.
Figure 6 is a fragmentary end elevation of the camming structure incorporated in the knee illustrated in Figure 5.

Referring now to Figures 5 and 6, there is shown another embodiment of apparatus. It will be understood that in this modification the remainder of the gear finishing machine is as illustrated in Figure 1 and that suitable head and tailstocks are mounted on the rocking table 126 which is pivotally supported on the outer table 125 by the pivot pin 127.

The method of finishing gears by diagonal traverse affords the possibility in many cases of finishing a gear from end to end with a relatively short traverse stroke, and in some cases this stroke may be so short that the relative traverse motion between the rocking table and the knee may be insufficient to provide an efficient camming action. In the present modification means have been provided associated with the traversing mechanism for providing independent relative motion between two camming elements whereby the rocking motion of the table relative to its traverse may be as rapid as desired.

In this modification there is illustrated a gear 101 which is in a train of gears 102 which includes gears for driving a feed screw (not shown) identical with the feed screw 46 in the modification previously described. Accordingly, the gear 101 is driven in timed relation to the rotation of the feed screw and hence in timed relation to the relative traverse of the tables 125 and 126.

A transmission support bracket 104 is provided which is rotatable as a unit about the axis of the gear 101 and which carries a spline shaft 105 having a bevel gear 106 at its lower end meshing with a bevel gear 107 rotatable with the gear 101. Extending upwardly from the bracket 104 is a rigid tube 108 on which is slidably mounted a housing sleeve 109 extending from a main housing 110. The housing 110 supports a bevel gear 111 keyed or otherwise secured to a splined sleeve 112 having non-rotatable but slidable engagement with the spline 105. The housing 110 also carries a bevel gear 114 mounted on a rotatable support 115 and having an internal splined formation slidably engaging a splined portion 116 of a camming screw 117.

The rocking table 126 has an outwardly and downwardly projecting arm 120 at one end from which projects a follower 121 slidable in a slot 122 carried by a cam slide 123. The cam slide 123 is supported for sliding movement by plates 124 and 124' and includes an adjustable camming member 128 in which the slot 122 is formed. The camming member 128 is adjustable about a horizontal axis and may be clamped in adjusted position by a clamping bolt 129. The cam slide 123 includes a recess 130 closed at one end by a removable feed nut 131 with which the camming screw 117 cooperates.

Rotation of the feed screw by the train of gears 102 results in timed rotation of the gear 101 and hence of the bevel gears 107 and 106, which in turn results in rotation of the camming screw 117. Dependent therefore upon the lead of the threads of the camming screw 117 and the nut 131, the cam slide 123 is caused to move longitudinally of the table 125 and thereby to effect rocking motion of the table through the medium of the cam follower 121 carried by the arm 120 and the slot 122 which may be inclined as desired. This mechanism provides means by which the rate of rocking may be relatively great as compared to the rate of relative traverse, and by a proper selection of change gears in the train 102 and/or the selection of the lead of the camming screw 117 the rate of rocking may be predetermined.

In this illustrated construction the camming slot 122 is illustrated as straight, but again it may have reversely inclined end portions, as will subsequently be described.

Referring now to Figures 7 to 12, there is illustrated yet another embodiment of the present invention. In this case the figures illustrate a modified knee construction which may be substituted in the complete machine illustrated in Figure 1 without modification of the other structure.

In this embodiment the knee 221 carries a driving bevel gear 201 whose axis is vertical and which is adapted to mesh with a bevel gear 202 carried by the traversing feed screw 203. The feed screw cooperates with a feed nut 204 depending from the upper slide plate 233 to effect relative traverse between the upper slide plate 233 and the lower slide plate 230. Coaxial with the axis of the bevel gear 201 is a short shaft 205 carrying a bevel gear 206 meshing with the bevel gear 202, and at its upper end carrying a bevel gear 207 meshing with a bevel gear 208 carried by the camming screw 209. The outer table 225 carries an inner rocking or crowning table 226 which is pivoted thereto for rocking movement by a pin 227.

Figure 7:
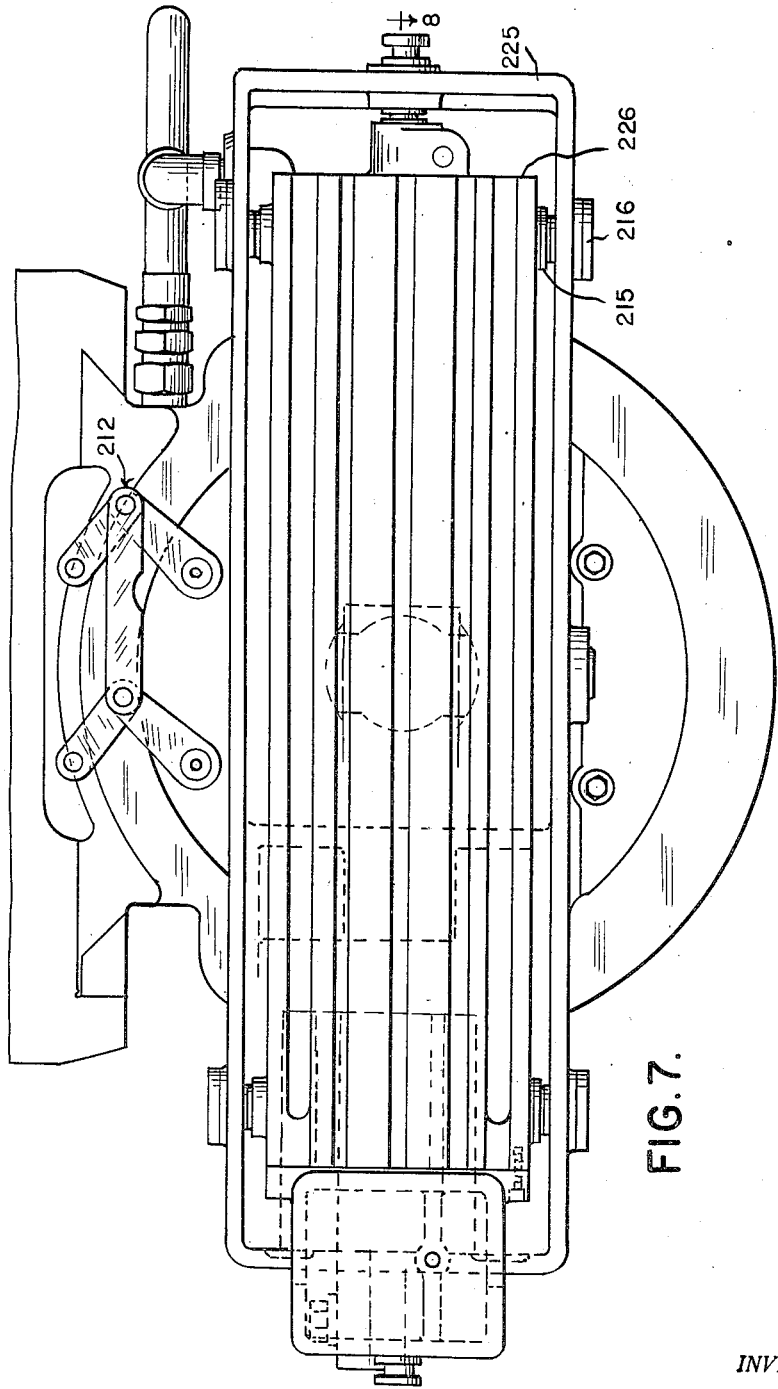
Figure 7 is a plan elevation of a modified knee construction which may be substituted for the knee illustrated in Figure 1.

As best seen in Figure 7, the outer table 225 has a linkage, indicated generally at 212, for preserving orientation of the tables 225 and 226 during angular adjustment of the plates 230 and 233 so as to adjust the direction of traverse of the tables. The rocking table 226 is provided with work plates 215 in guiding contact with hardened guide elements 216 so as to prevent lateral movement of the table 225 during rocking movement thereof. The table is also provided with locking means indicated at 217 which retains the two tables in rigidly associated relation of rocking is not desired. A jack screw 218 is also provided intermediate the tables 225 and 226 but is disconnected when the crowning operation is to be performed.

Since the shaft 205 is concentric with the axis of the gear 201, it will be appreciated that the sandwich comprised by the plates 230 and 233 may be rotated to adjust the direction of traverse of the tables without destroying the driving connection afforded by the gears 201, 202, 206, 207 and 208. It will also be observed that as illustrated the camming screw shaft 209 will be rotated at substantially greater speed than the traverse screw 203.

Figures 11, 12:
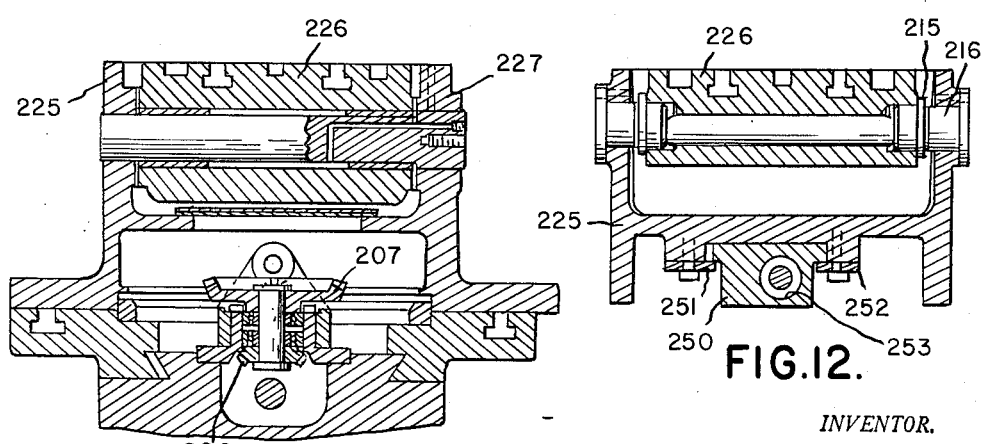
Figure 11 is a fragmentary section on the line 11—11 of Figure 8.
Figure 12 is a fragmentary section on the line 12—12 of Figure 8.

The outer table 225 is provided with a cam slide 250, it being supported thereon by plates 251 and 252, as best seen in Figure 12. The cam slide 250 is provided with a recess 253 adapted to be closed by a removable nut 254 which cooperates with the threads in the end of the camming screw 209. Rotation of the camming screw 209 therefore effects longitudinal movement of the cam slide 250. At its outer end the cam slide 250 is provided with an adjustable head 255 having a slot 256 formed therein. The head 255 is adjustable about a horizontal axis and may be clamped in adjusted position by a clamping bolt 257.

The rocking table 226 has an overhanging arm 260 which projects downwardly into the neighborhood of the head 255 and there supports a pin having a flattened portion 261 which is received in the slot 256. The pin having the flattened portion 261 is adjustable about its axis so as to cause the flattened portion to properly enter and be guided by the slot 256.

Figures 8, 9:
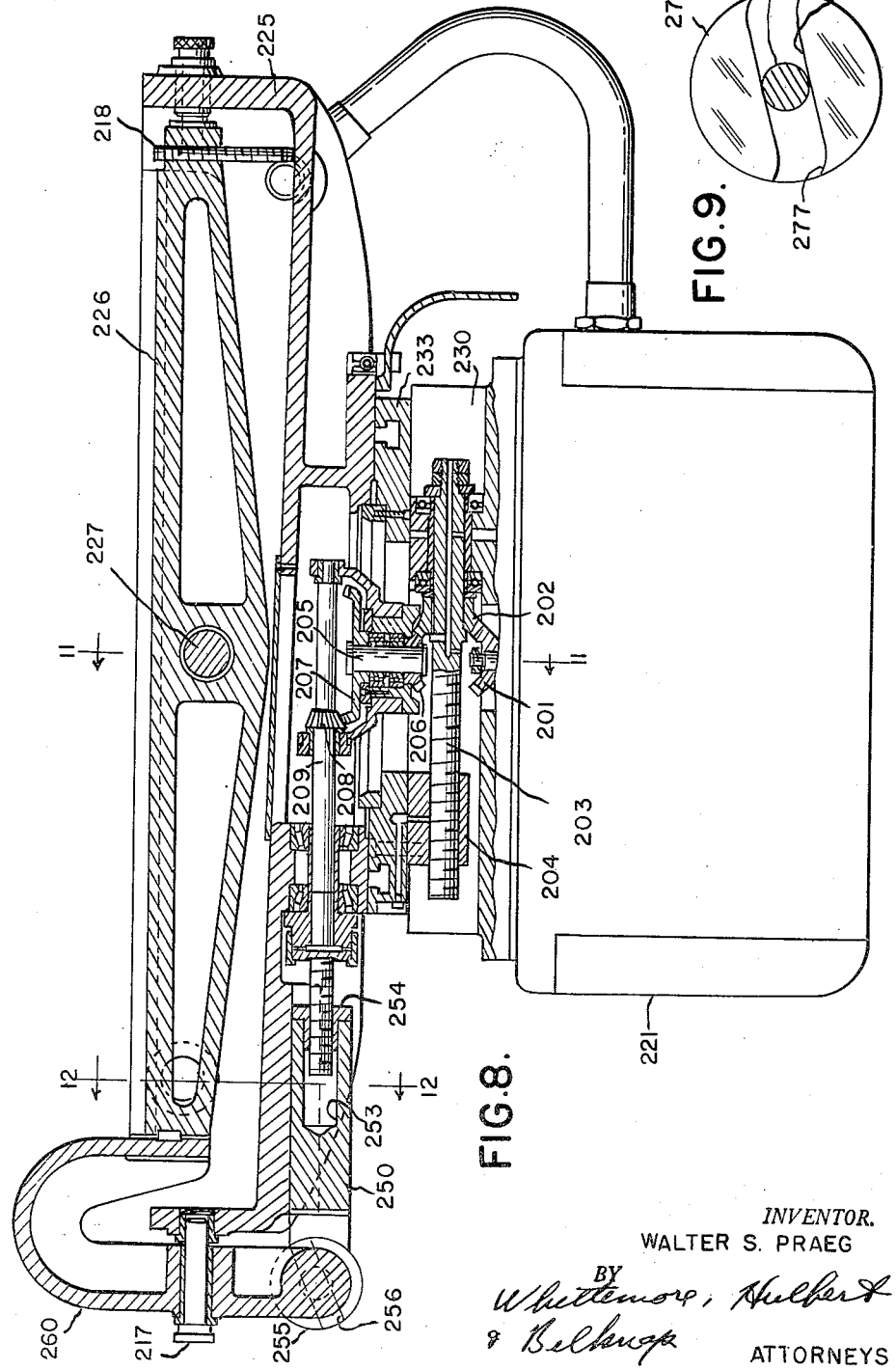
Figure 8 is a front elevation of the knee shown in Figure 7, with parts sectioned along the line 8—8 of Figure 7.
Figure 9 is a detail view illustrating a modified cam construction.
Figure 10:
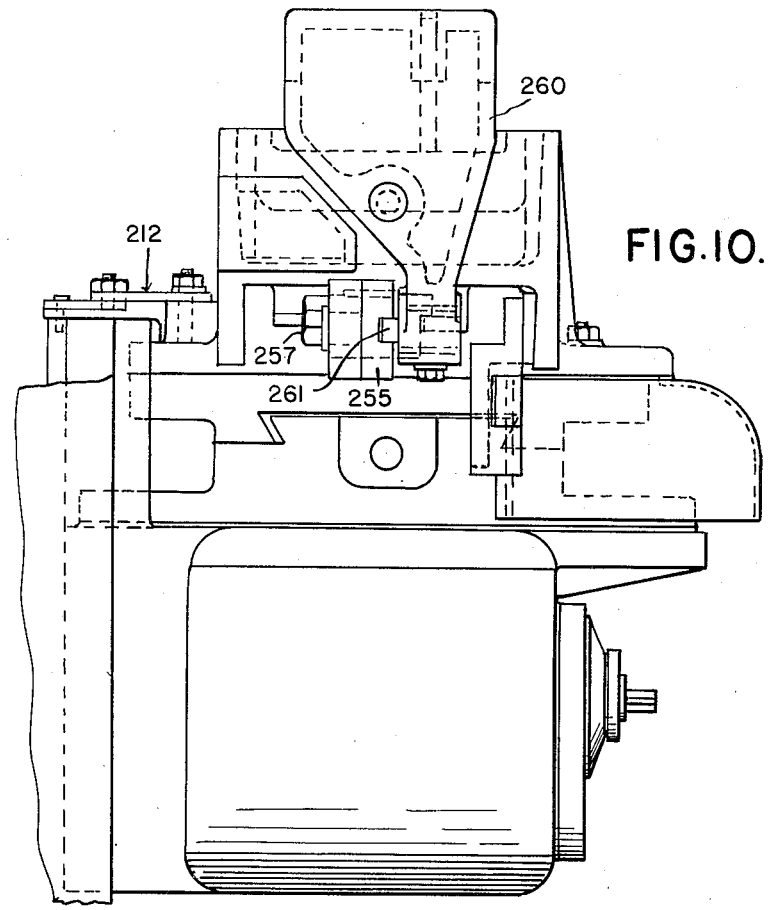
Figure 10 is an end elevation of the knee illustrated in Figures 7 and 8.

Referring now to Figure 9, there is illustrated a modified form of cam slot. In the embodiments thus far specifically illustrated and described the cam slots 66, 122 and 256 have been straight. Reference has been made to the fact that diagonal traverse sometimes requires relatively rapid and relatively great rocking movement with respect to traverse. In some limiting cases this relative rocking motion may be so great that interference may result, or it may be impossible to bring the gear and gear-like tool into a condition of loose mesh at the end of a stroke as is desirable. Accordingly, in Figure 9 there is illustrated a cam 275 having a slot the central portion of which is straight, as indicated at 276, and the opposite ends of which are reversely inclined as illustrated at 277. This arrangement, given the proper selection of length of stroke and the proper relative crowning traverse between the camming elements of the machine, may result in the rocking table being in substantially horizontal position at one end of the camming stroke. As traverse starts, the follower 278 which in this case will be round, causes a relatively abrupt rocking motion of the rocking table to a limiting position as determined by the adjustment of the cam. Thereafter traverse throughout the major portion of the stroke results in reverse rocking of the table, and at the mid position during the stroke (a condition illustrated in Figure 9) the follower 278 is in mid position in the straight portion 276 of the cam and the table 226 is in horizontal position. Further traverse to the end of the stroke results in further rocking of the table 226 in the same direction until it reaches a limiting position as determined by the cam setting, which normally will be such that the table is rocked an amount equal to but in opposite sense from its initial tilted position. Further traverse, if such is effected, causes the cam follower to again enter the reversely inclined end portion 277 of the slot, which will cause the table to return toward horizontal position, thus introducing clearance between the teeth of the gear and tool.

The normal gear finishing operation as carried out with diagonal traverse is accomplished by an over and back reciprocation or traverse so that it is, strictly speaking, unnecessary to provide the reversely inclined portions at both ends of the cam 275. It is, however, highly desirable to have a reversely inclined portion at the end of the cam corresponding to the beginning of the stroke so that as the over and back traverse is completed, the rocking table assumes what approaches a horizontal position and clearance is introduced between the teeth of the gear and tool, thus facilitating unloading of the finished gear and loading of a new gear to be finished.

It will of course be understood that the cam illustrated in Figure 9 is more or less diagrammatically illustrated and it is contemplated that if desired this cam may have adjustments provided thereon so that the reverse rocking at one or both ends of a stroke may begin after predetermined traverse from the central neutral position. On the other hand, the cam 275 in all modifications thus far described is easily replaceable so that it is entirely feasible to provide a separate cam for each crowning operation if such is desired.

Figure 13:
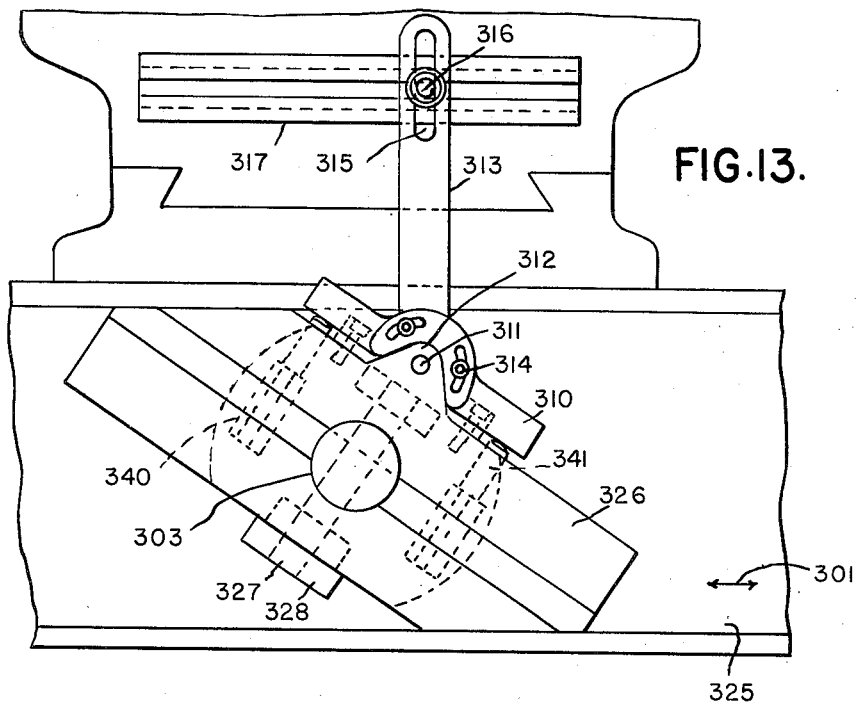
Figure 13 is a fragmentary plan view of a modified gear crowning machine.
Figures 14, 15:
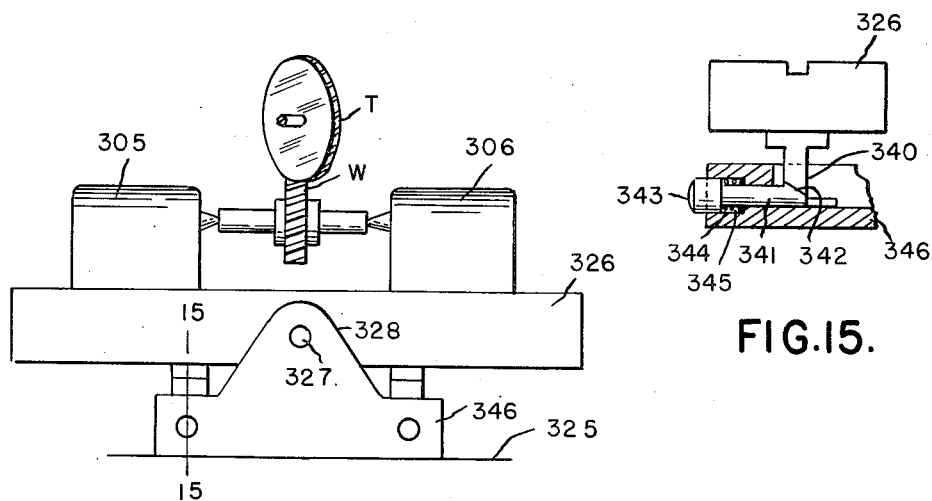
Figure 14 is a side elevation of the rocking table shown in Figure 13.
Figure 15 is a fragmentary section on the line 15—15 of Figure 14.

Referring now to Figures 13, 14 and 15, there is illustrated another embodiment of the present invention. In this case the outer table 325 is intended for reciprocation limited to the direction of the arrow 301 and it carries a rocking table 326 which is rockable about the axis of a pivot pin 327 carried by upstanding arms 328 carried by adjustable support mounted on the table 325. Inasmuch as the direction of traverse is limited to the direction of the arrow 301, adjustment between the direction of the traverse and the axis of a work piece W is effected by adjusting the support 346 angularly about a vertical axis as determined by a central pilot 303. The rocking table 326 carries heads 305 and 306 between which the work piece W is mounted for free rotation. In this case a tool T is supported by an overhanging head precisely as in the embodiment of the invention illustrated in Figure 1. In fact, this embodiment of the invention may be considered as a case in which the direction of the ways in which the table 325 is slidable is fixed to extend transversely across the front of the machine.

In order to effect substantial rocking of the rocking table 326 even though the relative traverse in the direction of the arrow 301 is relatively slight, the following mechanism is provided. A camming bracket 310 is mounted for rocking movement about a pivot pin 311 supported between a pair of ears, one of which is indicated at 312. In order to accommodate different angular positions of adjustment of the rocking table 326, an actuating arm 313 is pivoted to the bracket 310 and is adapted to be locked in adjusted position by locking bolts 314. The arm 313 has an elongated opening 315 which receives a pin 316 adjustable along a slotted member 317.

As best seen in Figure 15, the rocking table 326 has depending camming elements 340 which are equally displaced laterally from the center thereof and which cooperate with slidable camming pins 341. The pins 341 have inclined camming surfaces 342 and as the pins are moved inwardly and outwardly with respect to the camming portions 340 of the table 326 the table 326 is caused to rock. The pins 341 have heads 343 against which bear compression springs 344 received in recesses 345 formed in the supporting structure 346.

It will be observed in Figure 13 that as the table 325 is traversed in a direction parallel to the arrow 301 the arm 313 will be caused to rock about its pivot point 311, thereby rocking the bracket 310 about the same point and moving one end of the bracket inwardly against one of the pins 341 while the other end of the bracket moves outwardly, permitting the other pin to move outwardly a corresponding amount under the influence of the compression spring 344.

It will be observed that the foregoing structure provides for relatively great rocking motion of the rocking table 326 in timed relation to traverse of the table 325 so that irrespective of how small the amount of traverse, a desired amount of rocking motion may be provided. In this case also it will of course be a simple matter to provide for the predetermined rocking motion described above in which the table is in approximately horizontal position at one end of the traverse and thereafter rocks to a predetermined maximum followed by a slow reverse rocking through neutral to a predetermined maximum in the other direction. This of course may be accomplished by suitable contouring of the camming element 341, which will be apparent to those skilled in the art without further elucidation.

Another embodiment of the invention is illustrated in Figures 16 to 18. Referring to these figures, the machine comprises a main frame 350 including an overhanging front portion 351 from which depends a tool support 352 carrying a gearlike cutting tool 353. The tool support 352 is mounted for adjustment about a vertical axis.

The machine comprises a forwardly extending knee 355 on which is a horizontally movable table 356, ways 357 being provided for guiding the table 356 in its transverse motion.

Secured to the upper surface of the table 356 is a crowning attachment including a rocking table 360, this table being mounted for rocking movement about a pivotal support 361 carried by upwardly projecting arms 362. The arms 362 are connected by a plate 366 which is angularly adjustable about a vertical axis with respect to the table 356. Mounted on the rocking table 360 is a tailstock 363 and a headstock 364 between which is mounted a work gear 365.

By virtue of the construction just described, the rocking table 360 may be angularly adjusted about a vertical axis, together with the plate 366, to dispose its axis at any desired angle. At the same time, the tool support 352 may be adjusted about a vertical axis to dispose the axis of the tool 353 carried thereby at any desired angle. Suitable means are provided for traversing the table 356 in the direction of the arrow 370 in Figure 17, and accordingly a gear and gearlike tool may be meshed with their axes crossed at the appropriate angle to bring about meshing engagement and the direction of the axis of the gear may be disposed at a desired angle with respect to the direction of traverse as indicated by the arrow 370.

In order to effect rocking of the table 360 in accordance with the back and forth traverse of the table 356 camming mechanism is provided. This mechanism takes the form of a support 371 carried by the fixed knee of the machine from which extends a bracket 372 having a head 373 provided with a plurality of pin receiving openings 374. Secured to the side of the plate 366 is a yoke 375 on which a block 377 is movable about pivot axis 376. An adjustable arm 378 having an elongated slot 379 is secured to the block 377 and may be clamped in adjusted position thereon by bolts 380 or the like. A pin such as indicated at 381 is received in one of the pin receiving openings 374 and extends through the slot 379.

Secured to the upper surface of the plate 366 is a pivot arm 382 which is mounted for movement about a vertical pivot pin 383 carried by the plate 366. Interconnecting the block 377 and the pivot arm 382 are a pair of links 385 by means of which the rocking movement of the block 377 about its pivot axis 376 is transmitted to the pivot arm 382, rocking it about its pivot axis 383. The pivot arm 382 is provided with an elongated slot 387 which receives an upwardly projecting pin 388 carried by a longitudinally shiftable cam bar 390 having inclined camming elements 391 at each end thereof. Accordingly, as the table 356 is traversed in the direction of the arrow 370 a rocking motion is imparted first to the block 377 and thence to the pivot arm 382, which in turn results in longitudinal shifting of the cam bar 390 in timed relation to traverse of the table. Preferably rollers 392 are carried by the underside of the rocking table 360 and rest upon the upper inclined surfaces of the cam elements 391 so that the rocking table 360 is at all times firmly held in whatever position it has been moved to by the cams 391 and the rollers 392.

By virtue of the adjustability provided by the plurality of pin receiving holes 374, the amplitude of longitudinal movement of the cam 390 may be selected. Furthermore, the bracket 372 is preferably longitudinally adjustable in its support 371 so that the head 373 thereof may be brought into proximity to the arm 378 in whatever position of adjustment the rocking table 360 may be.

In use the arm 378 will be adjusted about its pivot connection 376 so that in mid position of the table 356, or in other words a position corresponding to mid stroke of the table, the arm will be perpendicular to the direction of traverse, thus insuring equal rocking movement in both directions from an intermediate neutral position in which the rocking table 360 is parallel to the traversing table 356.

For simplicity the tool head 352 and the rocking table 360 have been shown in Figure 16 with the axes of the gear and tool parallel to the direction of traverse of the table 356. However, in use the rocking table will normally be swung around so that the axis of the gear being machined extends at a substantial angle but less than 60° to the direction of traverse and the tool head 352 will be adjusted to bring the teeth of the cutter into proper meshing engagement with the teeth of the gear being machined.

In the foregoing description reference has been made to the operation as a shaving operation. This implies the use of a shaving cutter of a type now familiar in the art which is in the form of a gear having grooves or serrations extending up and down the teeth of the cutter. The spaces between the grooves form guiding lines and the corners of these lines form cutting edges. In the operation of the machine the rotation of the gear and tool is at substantial speeds, such for example as between 200 and 1,000 surface feet per minute, and the relative traverse is relatively slow, such for example as between two and ten inches a minute.

While the operation as described is preferably carried out by employing a shaving cutter of the type referred to, similar results may be obtained when the gear finishing tool is a lap rather than a shaving cutter. In this case the removal of metal depends upon the provision of abrasive particles between the teeth of the lap and the teeth of the gear, as is well understood in the art. Accordingly, where the invention is defined as "gear finishing" it is to be understood that both shaving and lapping are included.

The drawings and the foregoing specification constitute a description of several embodiments of the improved machine and method for crowding gears by diagonal traverse in such full, clear, concise and exact terms as to enable any person skilled in the art to practice the invention, the scope of which is indicated by the appended claims.

What I claim as my invention is:

1. The method of crown finishing gears which comprises rotating a gear member and gear-like tool in mesh at crossed axes, and providing a relative crowning stroke between said members including relative traverse in a direction which occupies a plane parallel to the axes of said members and which is angularly related in said plane to the axes of said members, said crowning motion comprising a rapid approach between said members from loose mesh at one end of said stroke, a gradual separation between said members terminating when the mid portion of said gear teeth are being finished, a gradual approach between said members as the finishing action approaches the ends of said gear teeth, and a rapid separation between said members at the end of said stroke, leaving the members in a condition of loose mesh.

2. The method of crown finishing gears which comprises rotating a gear member and gear-like tool in mesh at crossed axes, and providing a relative crowning stroke between said members including relative traverse in a direction which occupies a plane parallel to the axes of said members and which is angularly related in said plane to the axes of said members, said crowning motion comprising a gradual separation between said members as the finishing action of said tool is caused to progress from one end of said teeth toward the mid portion thereof, terminating when the mid portion of said gear teeth are being finished, a gradual approach between said members as the finishing action approaches the ends of said gear teeth, and a rapid separation between said members at the end of said stroke, leaving the members in a condition of loose mesh.

3. The method of crown finishing gears which comprises rotating a gear member and gear-like tool in mesh at crossed axes, and providing a relative crowning stroke between said members including relative traverse in a direction which occupies a plane parallel to the axes of said members and which is angularly related in said plane to the axes of said members, said crowning motion comprising a relative rocking motion between said members in timed relation to said traverse, said relative rocking motion comprising movement from a neutral position with the members in loose mesh to a maximum cutting position as one end of the teeth of said gear member are engaged, through neutral position representing minimum cutting relation as the mid portions of said teeth are engaged to a second maximum cutting position as the other end of said teeth are engaged, the relative motions being retraced on the reverse stroke, whereby the finishing operation is completed with the members in loose mesh.

4. The method of crown finishing gears which comprises placing a gear member and gear-like tool member in loose mesh at crossed axes with the teeth of said gear member meshed adjacent one end thereof preparatory to rectilinear relative traverse between said gear and tool members in a direction occupying a plane parallel to the axes of both said gear and tool members, effecting a relative back and forth traverse in a direction angularly related to the axes of both gear and tool, and providing a sequence of relative rocking motion between said gear and tool members in timed relation to said traverse which comprises an initial quick rocking motion to displace the axis of one of said members a maximum amount from parallelism with said plane to initiate a relatively deep cut at said one end of said gear teeth, a comparatively slow rocking motion in the reverse direction causing the axis of said one member to pass through parallelism with said plane as the mid portions of the gear teeth are machined to a position in which the axis of said one member is displaced from parallelism with said plane in the opposite sense as the other end of said gear teeth are machined, and during reverse traverse retracing said relative rocking movement to terminate traverse and rocking with said gear and tool in loose mesh.

WALTER S. PRAEG.

REFERENCES CITED

The following references are of record in the file of this patent:

UNITED STATES PATENTS

| Number | Name | Date |
| --- | --- | --- |
| 2,157,981 | Drummond | May 9, 1939 |
| 2,249,251 | Mentley | July 15, 1941 |
| 2,380,208 | Ashton | July 10, 1945 |
| 2,387,679 | Praeg | Oct. 23, 1945 |
| 2,394,757 | Drummond | Feb. 12, 1946 |
| 2,435,405 | Praeg | Feb. 3, 1948 |

FOREIGN PATENTS

| Number | Country | Date |
| --- | --- | --- |
| 480,247 | Great Britain | Feb. 14, 1938 |